Figure 1:
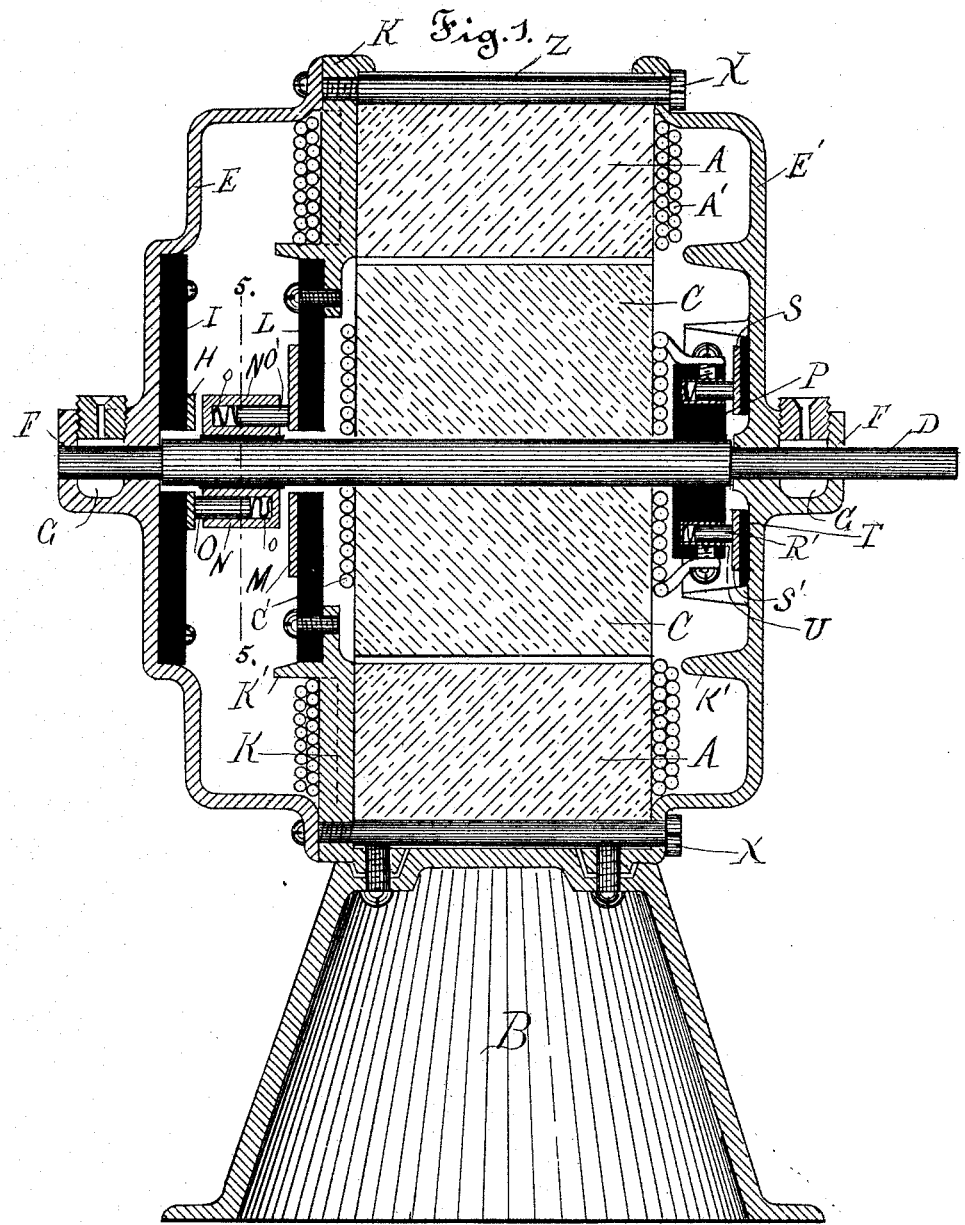

(No Model.) 3 Sheets—Sheet 1.

A. W. MESTON.
ELECTRIC MOTOR.

No. 491,970. Patented Feb. 14, 1893.

Witnesses:
J. W. Crookes.
A. W. Ramel.

Inventor.
Alexander W. Meston by
Paul Bakewell,
his attorney (No Model.) 3 Sheets—Sheet 2.
A. W. MESTON.
ELECTRIC MOTOR.
No. 491,970. Patented Feb. 14, 1893.
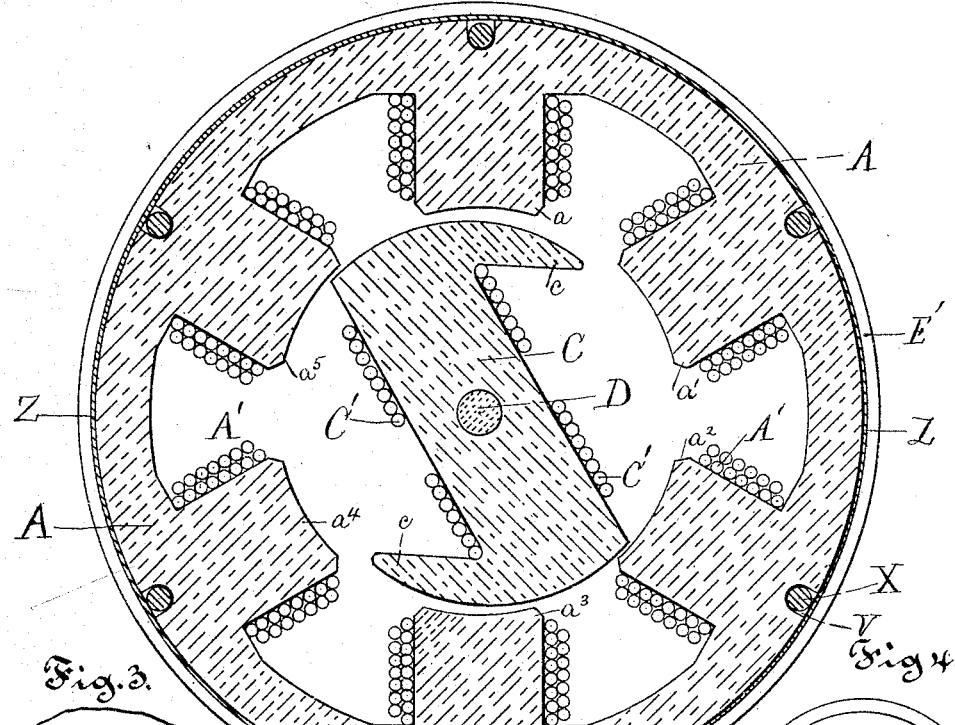
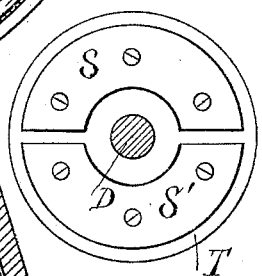
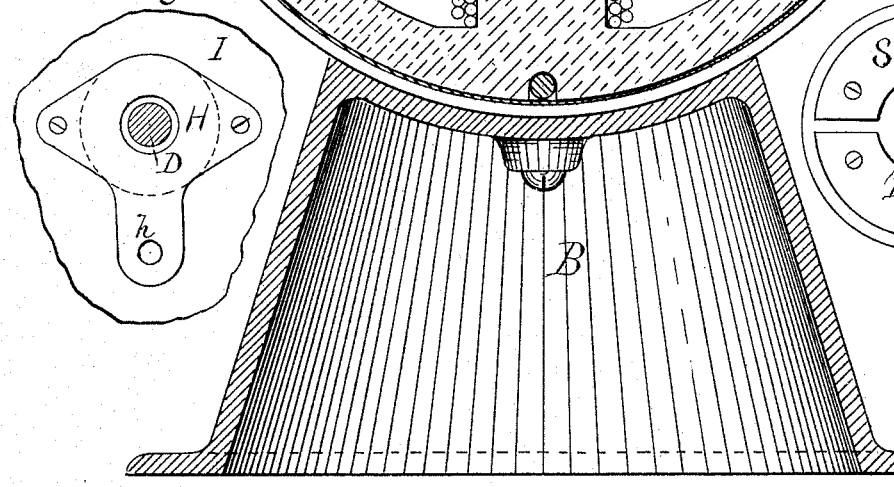
Witnesses.
J. W. Crookes.
A. Ramel.
Inventor.
Alexander W. Meston by
Paul Batewell,
his attorney
THE NORRIS PETERS CO., PHOTO-LITHO., WASHINGTON, D. C.

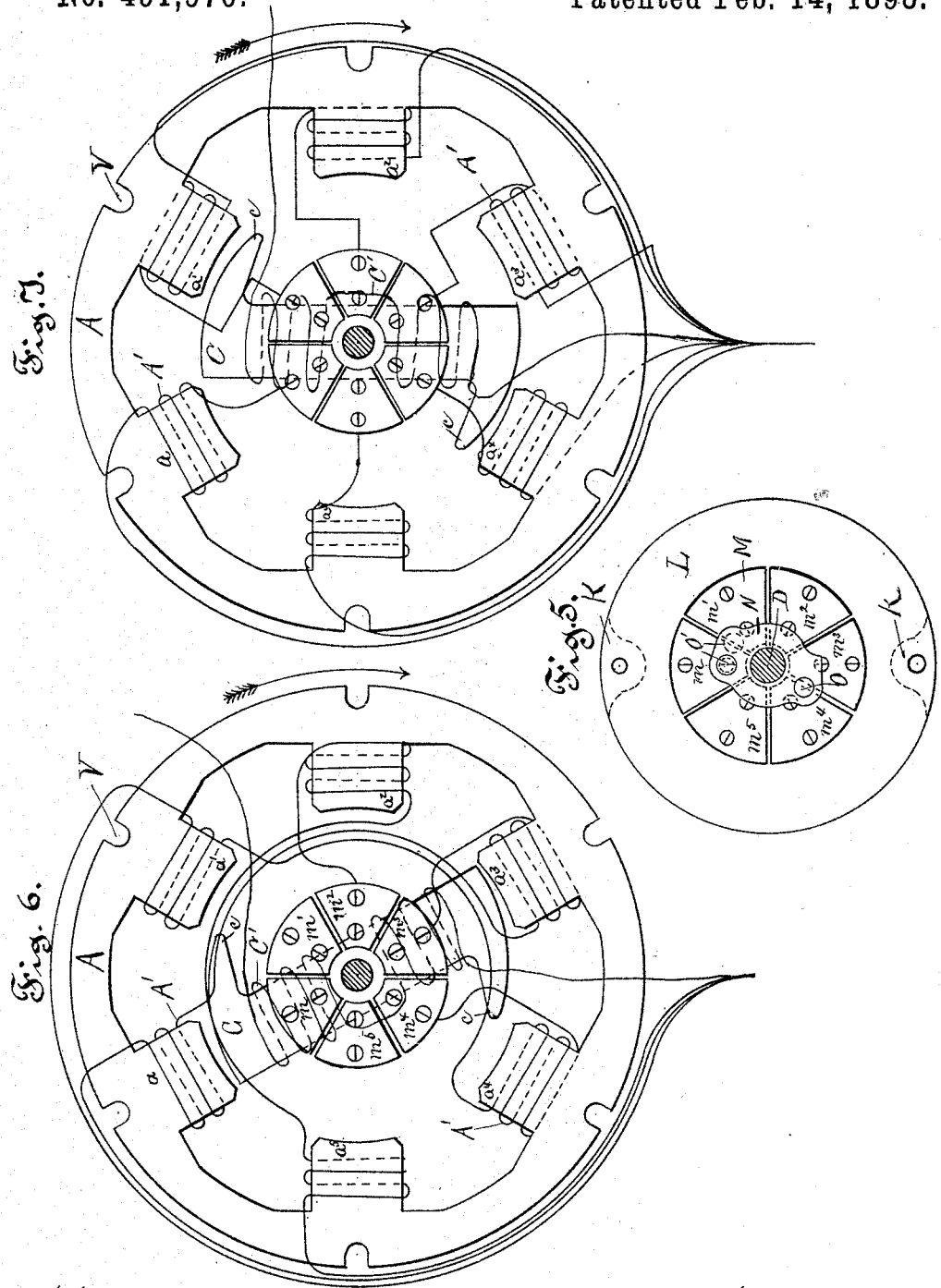

UNITED STATES PATENT OFFICE.

ALEXANDER W. MESTON, OF ST. LOUIS, MISSOURI.

ELECTRIC MOTOR.

SPECIFICATION forming part of Letters Patent No. 491,970, dated February 14, 1893.

Application filed June 15, 1891. Serial No. 396,248. (No model.)

*To all whom it may concern:*

Be it known that I, ALEXANDER W. MESTON, a citizen of the United States, residing in the city of St. Louis and State of Missouri, have invented certain new and useful Improvements in Electric Motors, of which the following is a full, clear, and exact description.

My invention relates to motors which derive their source of power from an electric current, *i. e.*, machines designed to transform electrical energy, derived from some source exterior therto, into mechanical energy.

It has for its object the production of an efficient and simple motor, designed to be actuated by periodic or alternating or by constant currents of electricity, which shall be self-starting and have a positive directive tendency of rotation at all speeds, and one which shall be, with a constant potential current, self regulating for speed, and consists in features of novelty and improvement hereinafter described.

In the accompanying drawings, in which like letters of reference denote like parts in the several figures, and in the following specification, I have illustrated and described a small form of my improved motor, designed to be used as a fan motor or in instances where small power is required, in which are embodied the essential features of my invention.

Figures 1 and 2 are central vertical sections, taken, respectively, parallel and at right angles to the armature shaft; Figs. 3 and 4 are, respectively, elevational views of the contact plate, to which one of the terminals of the machine is secured and from which, in the operation of the motor, as hereinafter described, the current is taken and delivered to the field magnet windings, and of the two-part commutator plate for rectifying the current to the armature coils; Fig. 5 is an elevational view of the segmental distribution plate for delivering the current to the proper field magnet coils, showing in cross-section the revolving contact making device or brush, taken as on the line 5—5 in Fig. 1; and Figs. 6 and 7 are outline views illustrative of the windings of the motor, showing in Fig. 6 a series wound machine and in Fig. 7 as wound in multiple, showing, relatively, as between the two views, a partially revolved position of the armature and consequent change in position of the contact points of the current distributing device.

A represents the field magnet frame of the motor, which is rigidly secured to the base casting B.

C is the armature rigidly secured to the armature shaft D.

E and E', see Fig. 1, are inclosing plates secured to the sides of the motor, in the centers of which are formed the journal bearings F and oil cups G for the armature shaft D.

H is a circular plate, formed with a laterally projecting arm *h*, (see Fig. 3,) to which a binding post, or like device, is secured for fastening one of the supply wires from the exterior, secured to the inside of the inclosing plate E, being insulated therefrom by the insulating plate I.

K is a spider plate secured to the field magnet frame A under the plate E, acting as a support for the insulating plate L, to which are secured the several leaves *m, m'*, &c., of the segmental distribution plate M, see Fig. 5.

N is the contact making device or revolving brush, which is rigidly secured on the armature shaft D, between the plates H and M, so as to revolve with it, but insulated therefrom, as shown in Fig. 1. The piece N is formed with several recesses or holes parallel to the armature shaft D, closed at one end, part of them being open toward the plate H and part toward the plate M. Into these holes are loosely fitted the contact pins O O' and beneath the pins are placed the small spiral springs *o*. On the other end of the armature shaft D, between the armature C and the plate E', is rigidly secured a block P of some insulating material, into which are fitted the metal tubes U closed at one end. Into the tubes U are fitted, as in the contact making device N, the two longitudinally movable contact pins R and R'.

S and S' are the parts of a two-part annular commutator plate [see Fig. 4], which is secured to the insulating plate T, the plate T being rigidly secured on the inside of the inclosing plate E', see Fig. 1.

One end of the armature shaft D is allowed to extend beyond one of the journal bearings convenient to receive a fan or pulley wheel [not shown], see Fig. 1.

A' represents the windings of the pole parts of the field magnet frame A, and C' the windings on the armature C.

The field magnet frame A is formed, as a whole, as an annular field of thin laminations of ring shaped pieces of sheet iron, as shown in Fig. 2, clamped together, preferably, by the screw bolts X, notches Y being formed in the outer circumferential edge of the pieces of which the field magnet frame A is composed for that purpose, as shown in Fig. 2. The pieces of metal of which the field magnet frame is composed are formed with inwardly projecting pole parts $a$, $a'$, &c., the inner edges of which are formed concave as corresponding to a circle concentric with the center of the armature shaft. The sides of the pole parts are made parallel so as to conveniently receive the exciting coils A', which are in this way replaceable, as, for instance, when burned out.

The armature C is composed of laminations of thin sheet iron of the form as shown in Fig. 2, clamped together and rigidly secured to the shaft D, the laminations being in a plane at right angles to the axis of revolution and parallel to the laminations of the field magnet frame A. The armature, as shown, is a simple bi-polar armature, equally disposed diametrically on either side of the shaft D. The armature instead of being formed in its diametrical dimensions concentric with its axis of revolution, is made eccentric, with the forward edge [forward in the desired direction of revolution] relatively radially reduced, see Fig. 2. It is also formed with forwardly projecting (forward in the desired direction of revolution) lip portions $c$, extending somewhat beyond the body of the armature. The effect and utility of forming the circumferential surface of the armature eccentric in this way and in adding the projecting lip $c$ will be apparent from the description of the operation of the machine.

The motor as a whole is inclosed in an inclosing case consisting in the circumferential split band Z and inclosing plates E and E'. The split band Z is retained in place around the field magnet by having its side edges secured in under the overlapping edges, respectively, of the inclosing plate E' and the spider plate K, and its ends included in between the body of the field magnet and the base casting B, which is secured to the same. The plate E, for reasons of convenience in the assembling of the machine, is adapted to be independently removable, otherwise the split band Z would be retained in place on that edge, by the overlapping flange edges formed in the outer circumferential edge of the plate E instead of under the overlapping edge of the spider plate K. The plates E' and K are secured together by several through bolts $x$ for which are formed transverse recesses or notches $y$ on the circumferential surface of the body of the field magnet, in order, that when the motor is assembled, the retaining bolts $x$ are passed beneath the split band Z, and are hidden from view, leaving an unbroken and smooth exterior surface on the split band Z. The plate E' and the plate K are formed with the transversely projecting knee pieces K', which are designed to act as supports to retain the coils A' in position.

The machine being connected up in series that is, the coils A' of the opposite pole parts $a$, $a'''$, &c., of the field magnet frame A in series, [as shown in Fig. 6] the path of the exciting or operative current is as follows:—
From the plate H, (see Figs. 1 and 3,) to which one of the outside conductors is attached by any convenient means, through the contact making device N, by means of the contact pins O and O', to one of the leaves of the distributing plate M. The particular one of the leaves of the plate M with which the pins O' make contact depends on the position of the armature, the relative position of the armature C and the contact making device N on the shaft D being such that the current is directed to the coils which will excite the poles that will act on the armature tending to start it in the desired direction—that of the arrows in Figs. 6 and 7, in the motor as described. The opposite leaves of the plate M are electrically connected together, so that, when the contact pin O' is on one of them, as $m$, or, in the half revolved position of the armature C, on $m'''$, the electric current will traverse the opposite field magnet coils A' connected therewith in series, as those of $a'''$ and $a$. From the coil $a$ it is conducted, if the armature is also wound as shown in the drawings, to one of the leaves of the two-part commutator plate, as S, Fig. 1. Through the contact pin R it is conducted through the armature coil C', and back through the contact pin R' to the other member S' of the two-part commutator plate to which the return outside conductor is connected by any convenient means. In a similar manner, in the revolution of the armature and of the contact making device, contact is made with the other segments of the distribution plate, the current is directed to the other coils connected therewith respectively, the ends of the different pairs of coils being brought to a common terminal as indicated.

In the multiple wound machine, as illustrated in Fig. 7, one of the ends of several field magnet coils are connected together and the other ends to the several leaves of the distributing plate M—the opposite parts of which are connected together as in the series wound machine, the armature coil being connected in between the terminals of the machine, with the rectifying commutator plate interposed in the circuit.

It will be obvious to all who are acquainted with the operative features of an electric motor, that the cause of rotation of the armature lies in the effort of the armature to seek a position which shall tend to close the magnetic circuit between the electrically excited field magnets, or to seek a position relative to such magnetic field to shorten the lines of force existing there.

In small motors from which a comparatively small amount of power is required, the winding of the armature may be dispensed with, thus simplifying the machine as a whole and reducing its cost of construction.

As illustrated in Fig. 5, I have constructed the contact making device N with two contact pins O' for making contact with the segmental plate M, the object being to always maintain circuit through the pins O' to the plate M, one of the pins always being against the plate M even when, as in passing from one segment to another, one pin might be raised off of one segment before, in the revolution of the device relative to the position of the armature, it was intended to cut off the current from the coil to which it leads, or, as in the other case, it might not make contact with a plate it was coming up to as soon as it was intended.

In the operation of the machine, the relative positions of the armature C and the contact making device N are such that contact is being made by the pins O' with that segment of the distribution plate M, which will direct the current through a set of coils that will establish a magnetic field in which the position of the armature, as effecting a maximum shortening of the magnetic lines of force existing between the excited poles, that is, a position of magnetic equilibrium for the armature, will be forward [forward in the desired direction of rotation] of the actual position of the armature, tending to rotate the armature. Before, however, the armature has reached this position of normal equilibrium the contact making device will have made contact with the segment next forward, shunting the electric current into the set of coils next forward, thereby extending, in the direction of rotation of the armature, the magnetic field and creating new lines of force, in which the normal position of equilibrium of the armature, as closing the magnetic circuit, is still farther forward. But before the armature has reached this secondary position of equilibrium, as between two sets of simultaneously and equally excited poles, it has by the consequent rotation of the contact making device opened the electric circuit to the backward set of coils leaving the armature under the influence of the forward set of coils only, when the operation as just described will be repeated.

It is to make the armature more sensitive under the influence of the forward set of magnetic poles, as just described, when the electric circuit is shunted through the excited coils thereof, that is to include more of the lines of force of the newly established magnetic field, that I form the armature C with the forwardly projecting lip portion c, which, at the time the electric circuit is shunted into the forward set of coils, has shunted, as it were, into the magnetic field thus created, offering a more complete magnetic circuit for the lines of force therein created than if made without the projecting lip portion. In this way the machine is made very sensitively self-starting. When the electric current is shunted into the forward sets of coils, it is done suddenly and with full active force, tending to give the armature a sudden impulse or jerk forward. To avoid this, that is to make this secondary pull more gradual and the rotation of the armature more even and regular, I form the circumferential surface of the armature eccentric to the axis of revolution, as indicated in Fig. 2, making the forward edges of shorter radial dimensions, so that in any one position of the armature there will be a greater space between it, at its forward edges, and the surfaces of the inwardly projecting pole pieces which are formed concentric with the center of revolution of the armature. That is, the magnetic circuit will be less complete at the forward edges of the armature. In this way, the forward movement of rotation of the armature will act as bringing the armature nearer to any one point of the field magnet pole pieces—wedging, as it were, into the magnetic field, gradually getting more under the controlling influence of that particular part of the field.

I claim—

1. In an electric motor, the combination, with a field-magnet provided with a plurality of polar extensions and helices on said polar extensions, of an armature, a stationary terminal contact-plate, a distribution plate, or plates, for commuting the energizing current to said helices, and a contact-making device, interposed between the contact plate and distribution plate: substantially as, and for the purposes described.

2. In an electric motor, the combination, with a field-magnet provided with a plurality of polar extensions and helices on said polar extensions, of an armature, a stationary terminal contact-plate, a stationary distribution plate, or plates, and a revoluble contact-making device interposed between the contact-plate and distribution plate: substantially as, and for the purposes described.

3. In an electric motor, the combination with a multi-polar field-magnet, helices on the polar-extensions thereof, a bi-polar armature, and a winding on said armature, of a commutator for directing the current to successively energize the polar-extensions of the field-magnet, and a commutator for reversing the direction of the energizing current through the armature winding, substantially as and for the purposes specified.

4. In an electric motor, the combination with a multi-polar field-magnet, the polar-extensions of which are oppositely placed, helices on the said polar-extensions, to opposite pairs of which the energizing current is simultaneously directed, always in the same direction, a bi-polar armature, and a winding on said armature for energizing and polarizing the same, of a commutator for directing the current to successively energize the polar-extension of the field-magnet and a commutator for reversing the direction of the current through the armature winding, substantially as and for the purposes specified.

5. In an electric motor, the combination, with a field-magnet, of a wound armature, a shaft therefor, a rectifying-plate, or plates, an insulation-block rigidly mounted on the armature shaft, yielding contact-making devices carried by said insulation-block adapted to make contact with said rectifying-plate, or plates, and electrical connections between the terminals of said armature winding and the contact-making devices: substantially as, and for the purposes described.

6. In an electric motor, the combination, with an armature and its shaft, of a segmental distribution-plate, a contact-plate, and means for establishing electrical connection between said contact-plate and said distribution-plate: substantially as, and for the purposes described.

7. In an electric motor, the combination, with an armature and its shaft, of a stationary segmental distribution-plate, a stationary contact-plate, and means adapted to rotate with the armature shaft for establishing electrical connection between said contact and distribution plates: substantially as, and for the purposes described.

8. In a dynamo-electric machine, the combination with the herein described inclosing case, consisting in a split band, of the side clamping plates provided with the overlapping flange edges, through bolts by which the side clamping plates are secured together, and a base casting, between which and the body of the motor, the ends of the encircling band are included; substantially as and for the purposes described.

9. In an electric motor, a contact-making device rigidly secured to the armature shaft, a stationary contact-plate secured to the framing of the motor, and a stationary segmental distribution-plate secured to the framing of the motor, the said contact-making device being adapted, in the operation of the machine, to make circuit between the said contact-plate and the different sections of said distribution-plate, combined and operating substantially as described and for the purposes specified.

10. In an electric motor, a device for establishing electrical circuit from the exterior supply wires to the different field-magnet coils, consisting of an annular contact-plate secured to the framing of the machine, a segmental distribution-plate secured to the framing of the machine, to the several sections of which are secured, respectively, one end of the several field-magnet coils, and a contact-making device rigidly secured on the armature shaft, said device consisting of a supporting-block formed with two or more recesses into which are fitted spring-governed pins adapted, in the operation of the machine, to make contact, respectively, with the said contact-plates and the different sections of the said distribution-plate, combined and operating substantially in the manner described and for the purposes specified.

In testimony whereof I have affixed my signature, in presence of two witnesses, this 30th day of May, 1891.

ALEXANDER W. MESTON.

Witnesses:
J. W. CROOKES,
A. RAMEL.